F. H. VAN HOUTEN.
OILER FOR DOUGH DIVIDER CYLINDERS.
APPLICATION FILED AUG. 24, 1918. RENEWED JULY 11, 1919.
1,314,170.
Patented Aug. 26, 1919.
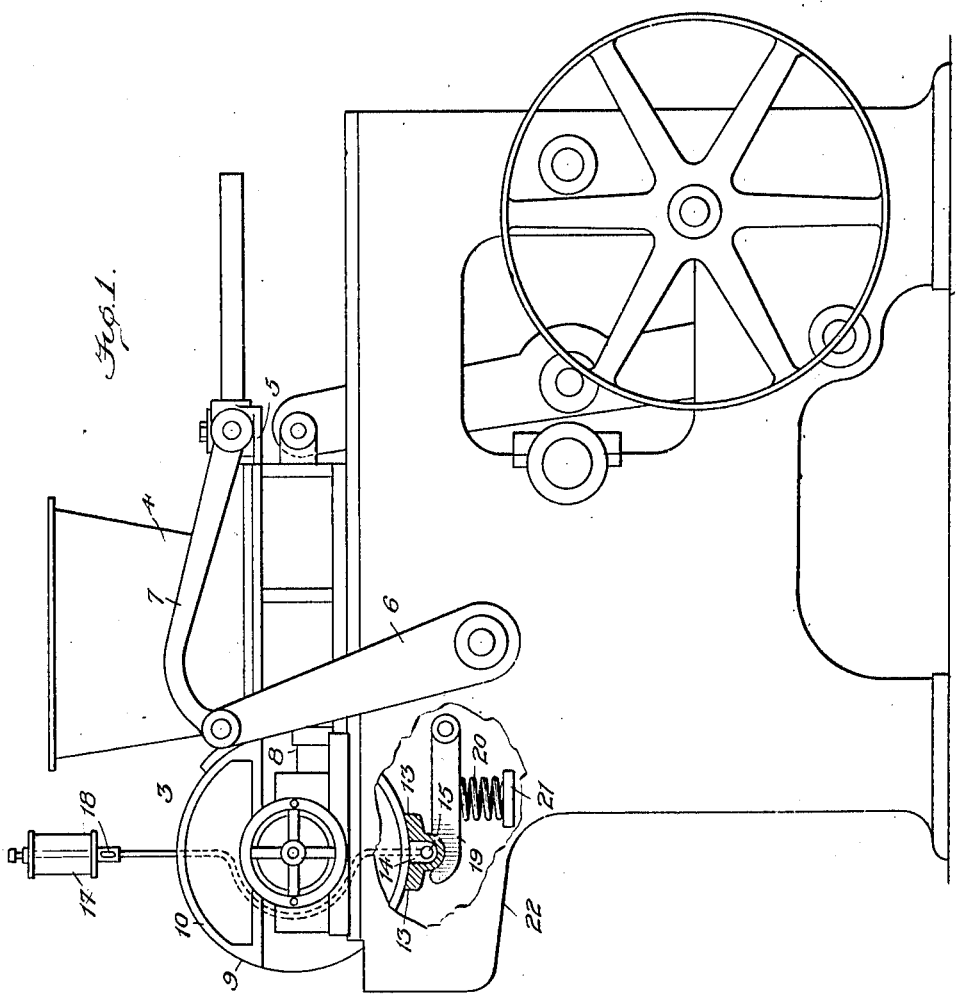
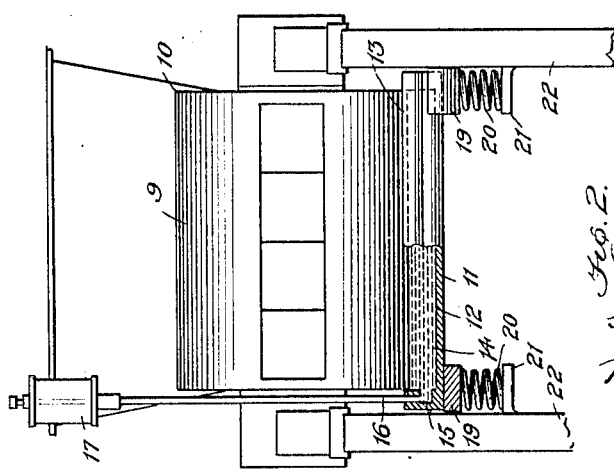
Inventor
Frank H. Van Houten
By
his Attorneys

UNITED STATES PATENT OFFICE.

FRANK H. VAN HOUTEN, OF BEACON, NEW YORK, ASSIGNOR TO DUTCHESS TOOL COMPANY, OF BEACON, NEW YORK, A CORPORATION OF NEW YORK.

OILER FOR DOUGH-DIVIDER CYLINDERS.

1,314,170. Specification of Letters Patent. Patented Aug. 26, 1919.

Application filed August 24, 1918, Serial No. 251,269. Renewed July 11, 1919. Serial No. 310,210.

*To all whom it may concern:*

Be it known that I, FRANK H. VAN HOUTEN, a citizen of the United States, residing at Beacon, in the county of Dutchess and State of New York, have invented certain new and useful Improvements in Oilers for Dough-Divider Cylinders; and I do hereby declare the following to be a full, clear, and exact description of the same, reference being had to the accompanying drawings, forming part of this specification.

This invention relates to oiling devices for the cylinders of automatic dough dividing machines of any type, but particularly adapted for use with a machine of the type shown and described in my prior Patent No. 1,158,339, dated October 26, 1915.

The object of the present invention is to provide a simple and conveniently arranged oiler for such use. The device consists of a basin or pan held in place under the cylinder by means of two levers and springs. The upper face of the basin is made to conform to the shape of the cylinder and is provided with a groove running from one end of the basin to the other into which the oil is fed from a suitable reservoir, preferably a sight feed device. The oil fills the groove and comes in contact with the face of the cylinder and as the cylinder revolves the entire face is effectively lubricated.

In the drawings,—

Figure 1 is a side elevation of the device shown partly in section in place in an automatic dough divider which is broken away in part to expose the oiler.

Fig. 2 is an end elevation of part of the mechanism of Fig. 1, but showing parts of the oiling device in section.

In Fig. 1 my improved oiling device is shown in connection with a dough divider 3 having the usual hopper 4 for the introduction of dough. A reciprocating knife 5 is operated by means of a crank 6 connected with the knife rod by a link 7. The cylinder of the dough divider is provided with a number of compartments which are filled by the action of a plunger 8 in the usual manner. All of these parts are old in the art and need no further explanation, being described in a number of old patents, among others, Patent No. 1,158,339, granted to me on October 26, 1915.

The oiling of the face 9 of the cylinder 10 is accomplished by means of a basin or pan 11, the upper surface of which is curved to correspond with the face of the cylinder, thus providing a bowl 12 bounded on either side by a scraper edge 13. Longitudinally of the basin is a groove 14 extending from one end of said basin to the other and ending in a port 15 communicating with an oil pipe 16 leading from a reservoir 17 having a sight feed 18. The pan 11 is supported by means of a lever 19 on either end thereof, which lever in turn is supported by a spring 20 resting upon a lug 21 integral with the frame 22.

In operation oil is conducted from the reservoir 17 through the pipe 16 to the port 15 which is in communication with the central groove of the pan. The oil rising in this groove reaches the upper surface thereof and then contacts with the face of the cylinder, thoroughly lubricating the same as it revolves. The ends of the pan are not curved, as is the central part, thus permitting a pool of oil to collect slightly higher than the edges of the groove.

What is claimed is:

1. In a dough divider, a cylinder, a scraper member having an oil groove parallel with the axis of said cylinder, and means for resiliently holding the member in contact with the cylinder.

2. In a dough divider, a cylinder, a scraper member having an oil groove therein and contacting with said cylinder in a plurality of parallel lines, means to supply oil to said groove and means for resiliently holding the scraper member in contact with the cylinder.

3. In a dough divider, a cylinder, a scraper bearing against said cylinder and provided with an oil groove, a pair of levers pivoted to the divider and supporting the scraper at their outer ends, and means for resiliently holding the scraper in contact with the levers and the cylinder.

4. A dough cylinder oiling device consisting of a trough having an oil groove, a scraper edge on either side of said groove and an arc shaped upper face connecting each scraper edge with the oil groove.

5. In a dough divider, a cylinder, an oiling member having a face curved to correspond with the face of the cylinder and having a groove therein, a plurality of levers resiliently holding said faces in contact, and means to supply oil to said groove and face.

FRANK H. VAN HOUTEN.